United States Patent [19]

Dziaba

[11] Patent Number: 5,662,443
[45] Date of Patent: Sep. 2, 1997

[54] PREVAILING TORQUE NUT

[75] Inventor: Roman J. Dziaba, Buffalo Grove, Ill.

[73] Assignee: Illinois Tool Works Inc., Glenview, Ill.

[21] Appl. No.: 628,923

[22] Filed: Apr. 8, 1996

[51] Int. Cl.[6] ................................................ F16B 39/28
[52] U.S. Cl. ........................ 411/291; 411/280; 411/937.1
[58] Field of Search ............................... 411/290, 291, 411/280, 277, 276, 937, 937.1

[56] References Cited

U.S. PATENT DOCUMENTS

| 815,541 | 3/1906 | Leatherman | 411/291 |
|---|---|---|---|
| 961,063 | 6/1910 | Austin . | |
| 2,142,820 | 1/1939 | Olson . | |
| 2,213,353 | 9/1940 | Whitcombe | 411/288 |
| 2,221,961 | 11/1940 | Allen et al. . | |
| 2,487,219 | 11/1949 | Butler | 411/290 |
| 3,702,628 | 11/1972 | Cosenza | 411/280 |
| 5,499,893 | 3/1996 | Thurston et al. . | |

FOREIGN PATENT DOCUMENTS

| 850193 | 12/1939 | France | 411/291 |
|---|---|---|---|
| 929985 | 1/1948 | France | 411/280 |
| 940752 | 12/1948 | France | 411/280 |
| 1065797 | 5/1954 | France | 411/291 |
| 1371833 | 8/1964 | France | 411/291 |

*Primary Examiner*—Flemming Saether
*Attorney, Agent, or Firm*—Thomas W. Buckman

[57] ABSTRACT

An article engagable and retainable about a threaded shaft, which in one embodiment is a self locking nut a first end, an opposing second end, and a threaded bore with an axial dimension for receiving the threaded shaft. A plurality of resilient posts extend along the body member and are inclined inwardly toward the bore axis to provide a prevailing torque on a threaded shaft disposed in the threaded bore. A pair of resilient arms with end portions extend from each resilient post. Each resilient arms is inclined toward the second end of the body member to provide a prevailing torque on the threaded shaft disposed in the threaded bore. The resilient posts and resilient arms contribute to retaining the body member about the threaded shaft. The lock nut has a relatively low first installation torque and a relatively consistent torque performance with reduced statistical spread over several nut installation and removal cycles, which meet an established torque specification.

6 Claims, 2 Drawing Sheets

PREVAILING TORQUE NUT

BACKGROUND OF THE INVENTION

The invention relates generally to an article engagable and retainable about a threaded shaft, and more specifically to a low profile, self locking unitary nut having a relatively consistent torque performance with a reduced statistical spread over several repeated cycles of nut installation and nut removal about the threaded shaft.

Lock nuts with a threaded bore engagable about a threaded shaft have many configurations and applications. There exists for example a variety of lock nuts having gaps arranged transversely to the bore axis or gaps arranged radially to the bore axis and proximate one end portion of the nut. The gaps are narrowed by deformation of the nut to misalign the threads in an effort to provide means for retaining the nut in tight engagement about the shaft. Nut retention performance however is often diminished substantially upon removal of the nut from the shaft resulting from a tendency of the gap or gaps to widen as the nut is thread about the shaft during installation and removal. This adverse effect on retention performance is particularly significant after the first installation and continues to worsen as the nut is subject to repeated cycles of installation and removal, which may be necessary for cleaning or maintenance. In practice, a large torque is generally required for the first installation of the nut about the shaft in comparison to a substantially reduced torque required for subsequent removal and installations, which is indicative of the compromise in nut retention performance. These prior art nuts do not provide optimum retention performance, have low retention performance after removal from the shaft, and have a relatively inconsistent torque performance with a large statistical spread, which often fails to comply with industry established torque specifications.

Others have endeavored to improve nut retention performance. U.S. Pat. No. 815,541 to Leatherman for example discusses a nut lock having opposing U-shape members disposed about a threaded bore wherein the U-shape members are formed by a combination of slots arranged transversely and radially to the bore axis. A median portion of each U-shape member is connected to the nut by a corresponding neck, and the end portions of the U-shape members are inwardly bent toward the bore axis to provide tight engagement with the shaft. This nut however lacks optimum retention performance, has low retention performance after removal from the shaft, and has a relatively inconsistent torque performance with a large statistical spread, which often fails to comply with industry established torque specifications.

U.S. Pat. No. 2,213,353 to Whitcombe discusses a lock nut having opposing U-shape members formed in a cylindrical extension of the nut. The trailing end portion of each U-shape member is downwardly bent, and one or more end portions are inwardly bent toward the bore axis for nut retention. Whitcombe however teaches away from downwardly bending the leading end portion of each U-shaped member to prevent cross threading during installation. In addition, the cylindrical extension disposed on the nut of Whitcombe adversely increases the profile of the nut thereby limiting its use in applications that require a low profile. This nut also lacks optimum retention performance, has low retention performance after removal from the shaft, and has a relatively inconsistent torque performance with a large statistical spread, which often fails to comply with industry established torque specifications.

In view of the discussion above, there exists a demonstrated need for an advancement in the art of retaining a threaded member about a threaded shaft.

It is therefore an object of the invention to provide a novel article engagable and retainable about a threaded shaft that overcomes problems in the prior art.

It is also an object of the invention to provide a novel article engagable and retainable about a threaded shaft that is economical, reusable and provides improved torque performance.

It is another object of the invention to provide a novel article engagable and retainable about a threaded shaft wherein the article has a reduced first on torque.

It is a further object of the invention to provide a novel article engagable and retainable about a threaded shaft wherein the article has a relatively consistent torque performance with reduced statistical spread over several nut installation and removal cycles.

It is a further object of the invention to provide a novel article engagable and retainable about a threaded shaft wherein the article has an improved torque performance that meets an established torque specification.

Accordingly, the present invention is drawn to a novel article having a body member engagable and retainable about a threaded shaft wherein the body member, which in one embodiment is a tool engagable nut, includes a first end, an opposing second end, and a threaded bore with a bore axis for receiving the threaded shaft. A plurality of resilient posts extend along the body member wherein each resilient post is inclined inwardly toward the bore axis to provide a prevailing torque on a threaded shaft disposed in the threaded bore. A pair of resilient arms with end portions extend from each resilient post wherein each pair of resilient arms is inclined downwardly toward the body member to provide a prevailing torque on a threaded shaft disposed in the threaded bore. The resilient posts and resilient arms contribute to retaining the body member about the threaded shaft. The prevailing torque nut has a relatively low first installation torque and a relatively consistent torque performance with reduced statistical spread over several nut installation and removal cycles within an established torque specification. The lock nut preferably is a unitary member formed of a metal material.

These and other objects, features and advantages of the present invention will become more fully apparent upon consideration of the following Detailed Description of the Invention with the accompanying drawings, which may have disproportionate dimensions for ease of understanding, wherein like structure and steps are referenced by corresponding numerals and indicators.

DETAILED DESCRIPTION OF THE INVENTION

Figure 1:
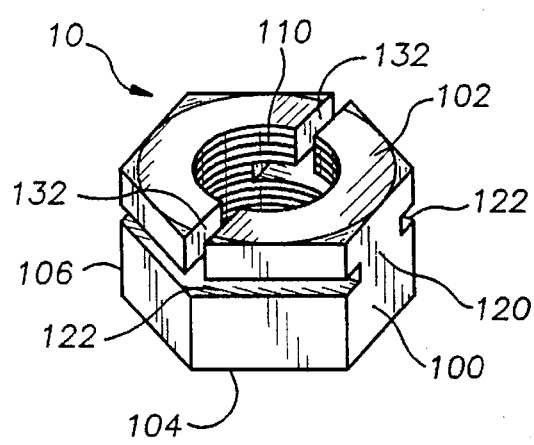
FIG. 1 is a perspective view of an article according to an exemplary embodiment of the invention.
Figure 2A:
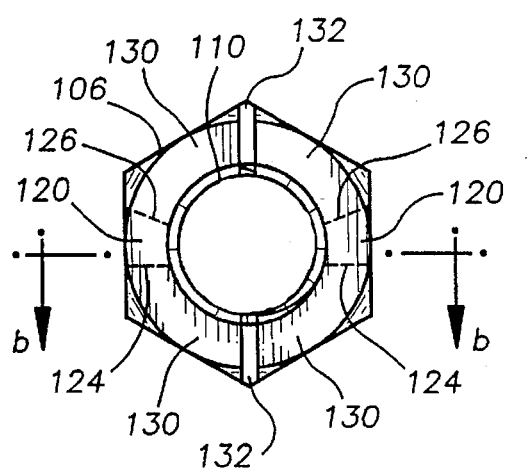
FIG. 2a is a top view of the embodiment of FIG. 1.
Figure 2B:
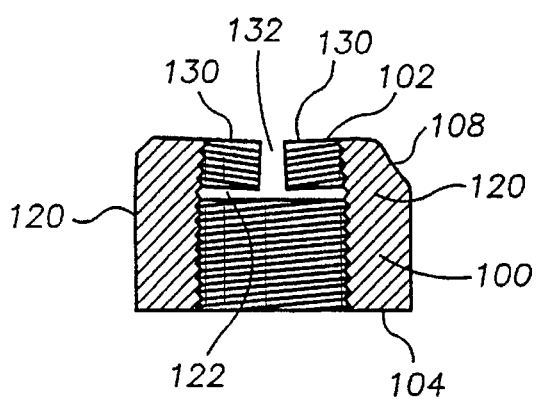
FIG. 2b is a partial sectional view taken along lines b—b of the embodiment of FIG. 2a, which also illustrates an alternative outer surface shape.
Figure 3:
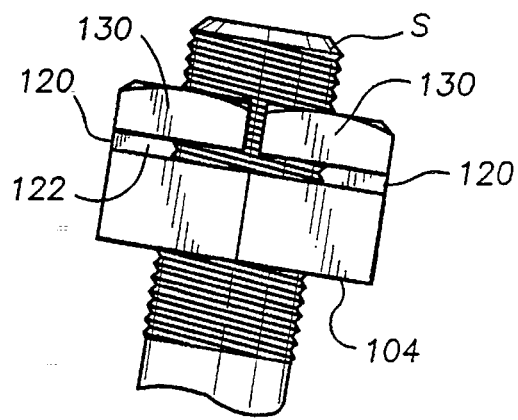
FIG. 3 is side view of an exemplary article disposed and retained about a threaded shaft.

FIGS. 1–3 illustrate an article 10, which in the exemplary embodiment is a self locking nut, generally comprising a body member 100 with a threaded bore 110 having a bore axis for receiving a threaded shaft S of a bolt or other member known in the art wherein the nut is engagable and retainable about the threaded shaft. Although the exemplary embodiment of the invention is discussed in the context of self locking nuts with tool engagable outer surfaces, the objects, features and advantages of the invention are likewise applicable to a general class of rotatable or fixed body members like tappets, pipes and flanges having a threaded bore portion for receiving a threaded shaft portion. The exemplary embodiment also includes a first end 102, an opposing second end 104 and a side portion 106, which may be configured with a tool engagable side surface having a square, hexagonal or other useful shape. FIG. 2b includes a partial sectional view of an alternative body member with a modified side portion having a quasi-conical shape 108 tapered or bevelled toward the first end 102.

A plurality of resilient posts 120 extend along the body member 100. FIG. 2b shows each resilient post 120 inclined inwardly toward the bore axis to provide a prevailing torque on a threaded shaft disposed in the threaded bore. The plurality of resilient posts contribute to retention of the body member about the threaded shaft and prevent casual removal therefrom, which may result from vibration and thermal effects among other sources. The resilient posts 120 may be defined by transverse gaps 122 formed or disposed in respective side portions of the body member. The exemplary embodiment includes two transverse gaps 122 on substantially opposing sides of the body member to define two resilient posts 120. Alternative embodiments however may include additional transverse gaps to define additional resilient posts. Each transverse gap is arranged substantially transverse to the bore axis. In the exemplary embodiment, the transverse gaps are transverse to the bore axis. In another embodiment, not shown in the Drawing, the transverse gaps are inclined slightly relative to the bore axis at least parallel with the bore threads. The transverse gaps of the exemplary embodiment are located toward the first end 102 and extend through the side surface 106 or the tapered surface 108. The transverse gaps may alternatively be located anywhere along the side portion of the body member between the opposing ends 102 and 104.

In one embodiment, resilient ports 120 are defined by transverse gaps 122 formable by a cutting operation, which generally occurs after threading the bore wherein portions of the resilient posts 120 also have a threaded surface. In alternative embodiments, the resilient posts 120 may be formed by other operations and processes either before or after threading the bore. FIG. 2a illustrates a first transverse gap having a linear or straight edge 124 formable with a straight edge cutting tool. FIG. 2 also illustrates a second transverse gap having an arcuate edge 126 alternatively formable with a curved edge cutting tool like a rotary disk.

A pair of resilient arms 130 extend from each resilient post 120 wherein each arm extends from a substantially opposing side of the corresponding resilient post. FIG. 2b shows each resilient arm 130 inclined downwardly toward the body member 100 to provide a prevailing torque on a threaded shaft disposed in the threaded bore. The resilient arms 130 also contribute to retention of the body member about the threaded shaft, and prevent casual removal therefrom as discussed above. The resilient arms 130 may be defined by radial gaps 132 formed or disposed in respective side portions of the body member and intersecting corresponding transverse gaps 122. In the exemplary embodiment, two radial gaps 132 extending through the first end 102 intersect corresponding transverse gaps 122 to define the pair of resilient arms 130 on the two resilient posts 120. Additional radial gaps may be used to define additional resilient arms in alternative embodiments that include additional resilient posts. Each radial gap in the exemplary embodiment is arranged substantially radially to the bore axis, but in general the radial gap is oriented at any angle so long as the radial gap intersects the transverse gap to define a resilient arm that may be staked or depressed downwardly.

In one embodiment, the radial gaps are formable by a cutting operation, which generally occurs after threading of the bore wherein portions of the resilient arms 130 also have a threaded surface. In alternative embodiments, the resilient arms 130 may be formed by other operations and processes either before or after threading the bore.

In one mode of fabrication, end portions of the resilient arms 130 are staked or depressed downwardly toward the body member and the plurality of resilient posts 120 are inclined inwardly toward the bore axis. The deformed configuration of the resilient posts and resilient arms results in deformation of the bore threads and narrowing of at least a portion of the bore to provide a spring effect on a threaded shaft disposed in the bore, which effectively retains the body member about the shaft with a prevailing torque that resists loosening rotation of the body member relative to the shaft. The transverse and radial gaps are dimensioned to permit configuration of the resilient posts and resilient arms as discussed above. The self locking member 10 may alternatively be further processed by application of a coating or plating and heat treatment after formation and configuration of the resilient arms and resilient posts as discussed above.

The self locking body member preferably is a unitary member formed of a metal material that provides sufficient stress and tensile performance and at the same time is sufficiently resilient for optimum retention performance. The body member may for example be comprised of a carbon steel, or stainless steel or other material.

In operation, a threaded shaft S is disposed initially in the threaded bore through the second end 104 of the body member wherein the threads of the shaft are received without significant resistance. As the shaft is further threaded into the bore, the shaft begins to engage the deformed or misaligned threads and meet spring resistance from the inwardly inclined resilient posts and staked resilient arms. FIG. 3 illustrates the threaded shaft S urging the resilient posts 120 and resilient arms 130 toward the pre-deformed configuration wherein the shaft is subject to the prevailing torque provided by the downwardly staked resilient arms and the inwardly inclined resilient posts. The resilient posts and resilient arms also result in a reduced first installation torque and provide relatively consistent torque performance with reduced statistical spread over several installation and removal cycles.

Figure 4:
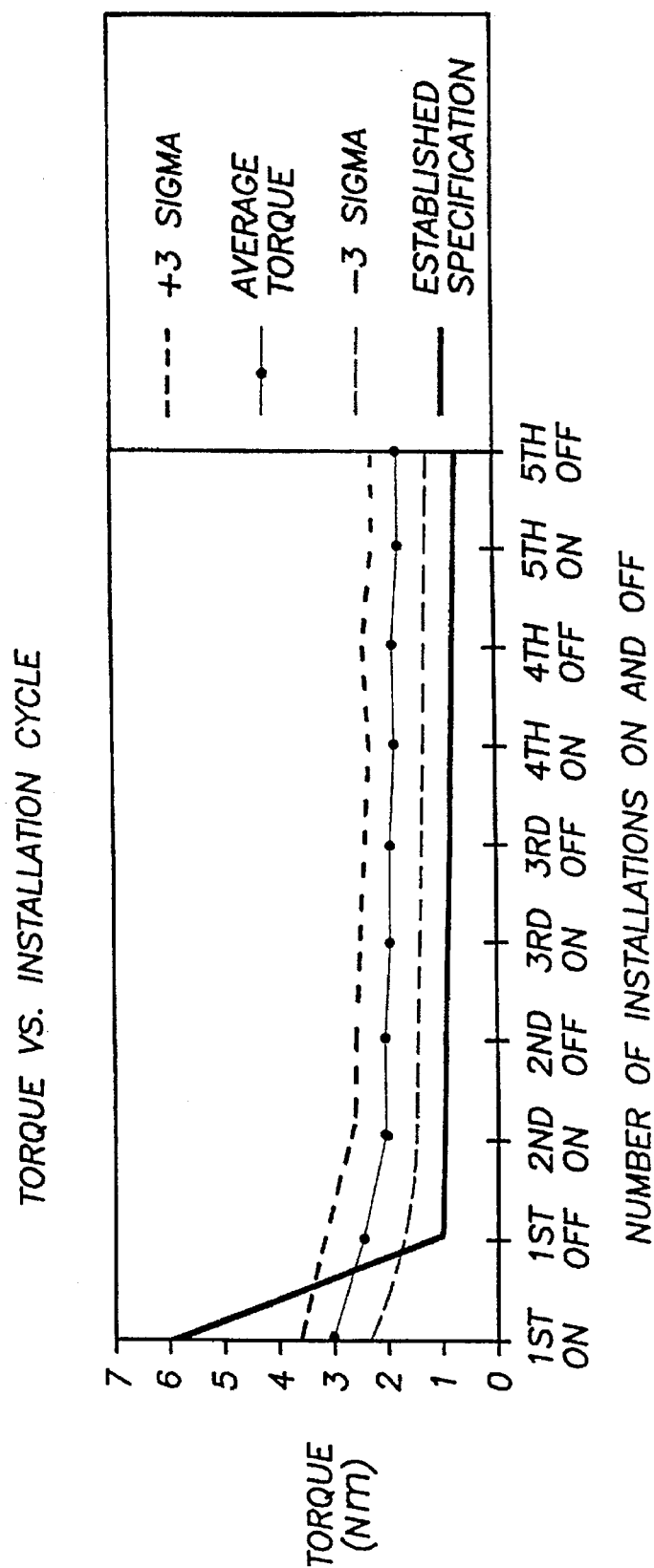
FIG. 4 is a graphical illustration of torque performance versus installation cycle for an article according to the present invention.

FIG. 4 is a graphical illustration of Torque performance versus Installation Cycle of a prevailing torque nut according to the present invention. The dots interconnected by the solid line plot average torque values, and the dashed lines plot the corresponding statistical spread, which in the exemplary graph includes points between "+3Sigma" and "−3Sigma". The solid line is an Established Specification which is satisfied when the "1st On" torque is below the solid line and when the "1st Off" torque through the "5th Off" torque are above the solid line. Remarkably, the prevailing torque nut of the present invention has a relatively low "1st On" torque and relatively consistent retention performance with reduced statistical spread over several nut installation and removal cycles. FIG. 4 shows that the average torque and corresponding statistical spread between "+3Sigma" and "−3Sigma" decrease at nearly constant rates characterized by a moderate downward slope that is within the Established Specification between the "1st On" and the "5th Off". The relatively flat slope indicates that the torque performance remains substantially constant over several nut installation and removal cycles without the substantial decrease in retention performance characteristic of prior art nuts. The statistical spread of the present invention is also reduced relative to the statistical spread of prior art lock nuts.

While the foregoing written description of the invention enables anyone skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. An article engagable and retainable about a threaded shaft, the article comprising:

a body member having a threaded bore with a bore axis for receiving the threaded shaft;

a plurality of resilient posts extending along the body member, each resilient post inclined inwardly toward the bore axis to provide a prevailing torque on a threaded shaft disposed in the threaded bore;

a pair of resilient arms with end portions extending from substantially opposing sides of each resilient post, each resilient arm of the pair of resilient arms extending from a substantially opposing side of the corresponding resilient post, each resilient arm inclined toward the body member to provide a prevailing torque on a threaded shaft disposed in the threaded bore, wherein the resilient posts and resilient arms contribute to retention of the body member about the threaded shaft, the body member having a relatively low first installation torque when receiving the threaded shaft in the threaded bore of the body member, and a relatively consistent torque performance with reduced statistical spread over several installation and removal cycles of the threaded shaft in the threaded bore of the body member.

2. The article of claim 1 wherein the body member is a nut.

3. The article of claim 1 wherein the plurality of resilient posts is two resilient posts defined by two transverse gaps on respective sides of the body member, the two resilient posts inclined inwardly toward the bore axis.

4. The article of claim 1 wherein the body member is a nut having a side surface with at least a portion engagable by a tool for installation of the nut about a threaded shaft.

5. The article of claim 4 wherein the side surface includes a modified side surface portion toward a first end of the body member.

6. The article of claim 1 wherein the plurality of resilient posts are defined by transverse gaps formed in respective side portions of the body member, and wherein the resilient arms are defined by radial gaps formed in respective side portions of the body member, each radial gap intersecting a corresponding transverse gap.

* * * * *